United States Patent [19]

Armstrong

[11] 3,766,405

[45] Oct. 16, 1973

[54] SWITCH WITH A CONTROLLABLE DUTY CYCLE

[75] Inventor: Charles H. Armstrong, Huntington Beach, Calif.

[73] Assignee: Clayton Manufacturing Company, El Monte, Calif.

[22] Filed: May 11, 1972

[21] Appl. No.: 252,258

[52] U.S. Cl. .................................. 307/133, 307/228

[51] Int. Cl. .................................................. H01h 7/16

[58] Field of Search ..................... 307/133, 130, 152, 307/228, 264, 265

[56] References Cited

UNITED STATES PATENTS

| | | | |
|---|---|---|---|
| 3,053,996 | 9/1962 | Stefanov | 307/228 |
| 3,529,180 | 9/1970 | Micheli | 307/228 X |
| 3,277,395 | 10/1966 | Grindle et al. | 307/228 X |

*Primary Examiner*—Robert K. Schaefer
*Assistant Examiner*—M. Ginsburg
*Attorney*—Harold L. Jackson et al.

[57] ABSTRACT

A switch having a duty cycle which varies with the level of an input signal is described. The switch includes a control circuit and load circuit and is arranged to close and open the load circuit in response to the application of first and second control signals to the control circuit. Control means including a sawtooth sweep generator and a comparator for comparing the instantaneous levels of the input signal and the sweep voltage is provided to apply the first control signal to the control circuit during a portion of each sweep period when the difference between such levels exceeds a preselected value. The second control signal is applied during the remainder of each sweep period. Thus the ratio of on to off time of the switch is proportional to the level of the input signal.

7 Claims, 4 Drawing Figures

SWITCH WITH A CONTROLLABLE DUTY CYCLE

BACKGROUND OF THE INVENTION

1. Field of the Invention

The present invention relates to a switch and more particularly to a switch with a variable duty cycle.

2. Description of the Prior Art

Many control systems utilize on-off mechanisms such as valves for controlling a variable in response to an input signal. For example, many hydraulic dynamometers in use today include on-off valves for supplying or withdrawing working fluid from the dynamometer to vary the absorbed torque. Such valves are manually controllable and the operator normally opens the appropriate valve for a short interval and then reads the absorbed torque on a meter to determine whether fluid should be added or withdrawn from the dynamometer. This process is repeated with smaller adjustments as the desired torque is approached. The manual operation may be eliminated by switching electrically operated valves on and off with a servo control system. However, it is difficult to prevent hunting or overcorrection where the controlled mechanism must be operated in only an on or off mode. Such disadvantages of prior art control systems may be overcome by the use of a switching mechanism in which the duty cycle is decreased as the error decreases. A controllable duty cycle switch is also useful in many other applications.

SUMMARY OF THE INVENTION

A switch is provided in which the duty cycle varies with the level of an input signal. The switch includes switching means (i.e. semi-conductor device) having a control circuit and a load circuit. The switching means is arranged to close and open the load circuit thereof in response to the application of first and second control signals to the control circuit. Control means is coupled to the control circuit of the switching means and is responsive to the input signal for periodically applying the first and second control signals to the control circuit at a selected repetition rate to vary the ratio of on to off time of the switch in accordance with the level of the input signal.

DESCRIPTION OF THE PREFERRED EMBODIMENTS

Figure 1:
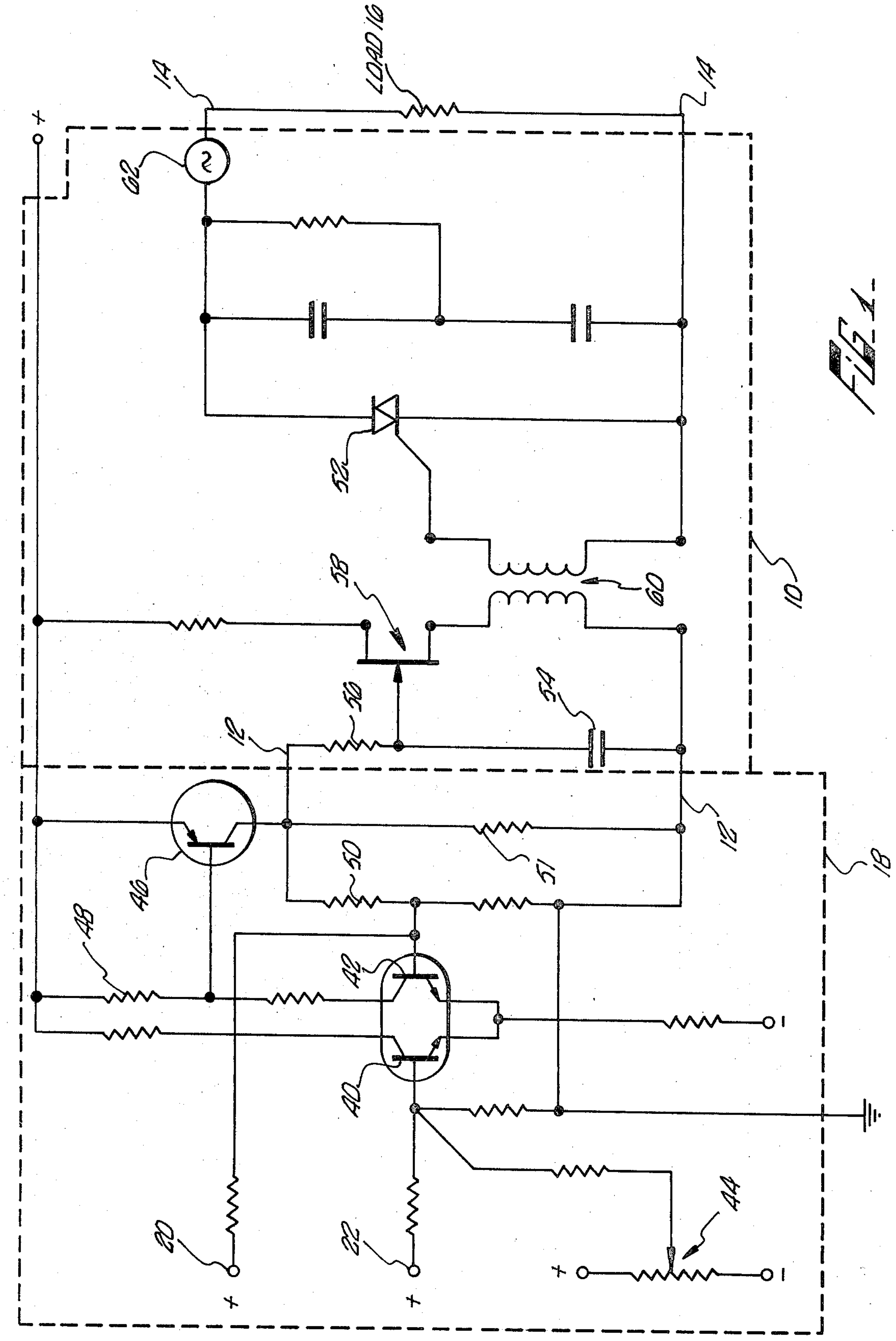
FIG. 1 is a schematic circuit diagram of a portion of a switch constructed in accordance with the present invention.
Figures 2, 3:
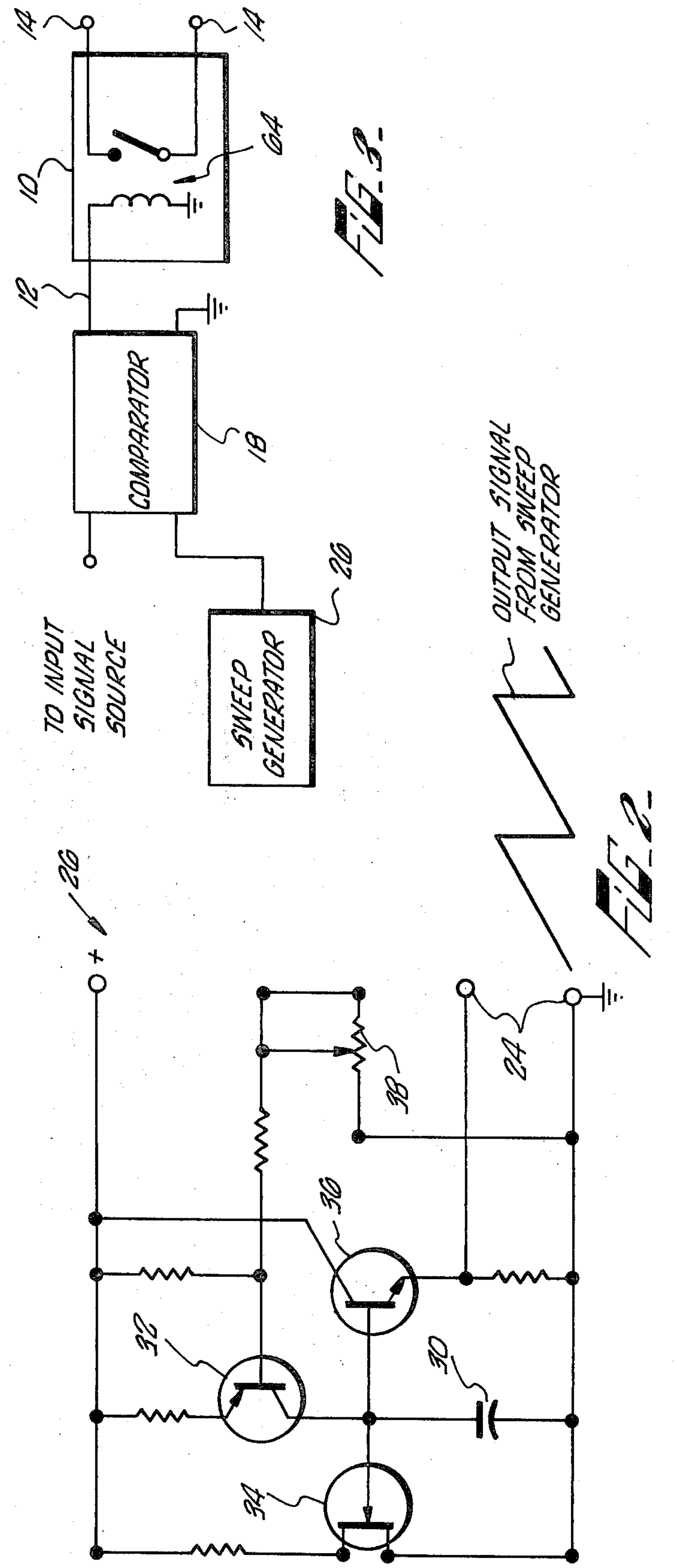
FIG. 2 is a schematic circuit diagram of the remaining portion of the switch of FIG. 1.
FIG. 3 is a block diagram of another embodiment of the present invention.

Referring now to the drawings, a switch having a duty cycle which varies with the level of an input signal includes switching means 10 and a comparator 18, shown in FIG. 1, and a sweep generator 26, shown in FIG. 2. The switching means 10 includes an input circuit 12 and an output circuit 14. The switching means is arranged to close and open the output circuit in response to the application of first and second control signals to the control circuit thereof as will be more fully explained. The comparator 18 includes a first input circuit 20 for receiving the input signal and a second input circuit 22 connected to an output circuit 24 of the sweep generator 26. The comparator compares the instantaneous levels of the input signal and the sweep signal and applies the first and second control signals to the control circuit of the switching means in accordance with said levels.

The circuit components, i.e., semiconductor devices, capacitors, resistors, transformer and voltage bias sources are illustrated by conventional symbols in the drawings. The sweep generator of FIG. 2 includes an integrating capacitor 30 which is charged through a current control transistor 32 until the charge reaches a predetermined level at which time the capacitor 30 discharges through a unijunction transistor 34. An emitter follower transistor 36 provides a sawtooth output voltage in the output circuit 24 which follows the charge on the capacitor 30. A potentiometer 38 may be adjusted to control the rate of current flow through the charging transistor 32 and thereby the charging rate of the capacitor 30 and repetition rate of the output sawtooth pulses illustrated in FIG. 2. The repetition rate of the output signal from a generator of FIG. 2 may be adjusted within any predetermined range to accommodate the characteristics of various control systems.

Referring now to FIG. 1, the comparator 18 includes a pair of matched transistors 40 and 42 which are connected to bias voltage sources through suitable resistors as shown to form a differential amplifier. A potentiometer 44 is connected between positive and negative voltage sources with the center tap connected to the base of the transistor 40 to set the input voltage response level of the amplifier. The resistors and voltage bias sources are chosen so that the transistors 40 and 42 are each conducting a nominal amount of current with an input signal on input circuit 20 of a predetermined level. As the sawtooth signal in input circuit 22 increases from its minimum value (i.e. 0 volts) to its maximum value (i.e. 10 volts) the current flow through transistor 4o increases and the current flow through transistor 42 decreases. A control transistor 46 is connected in the circuit with its base emitter junction in parallel with a bias resistor 48 so that the transistor 46 will conduct current only when the current flow through bias resistor 48 and through transistor 42 exceeds a preselected value. A positive feedback resistor 50 ensures full current flow through the emitter collector junction of the transistor 46 as soon as the preselected value of current through the transistor 42 is exceeded.

The potentiometer 44 is adjusted so that the preselected value of current through the transistor 42 is not reached unitl the input signal on input circuit 20 exceeds a preselected value, e.g. 0 volts. Within a predetermined range of input signal levels, for example, 0 to 10 volts, the transistor 46 will conduct current for a portion of each cycle of the sawtooth signal from the sweep generator 26. For example, an input signal having a level of +5 volts will cause the current flow through transistor 42 to exceed said preselected value until the level of the sawtooth signal on conductor 22 reaches +5 volts or during one-half of each cycle of the signal of the sawtooth sweep signal. The sawtooth signal on conductor 22 thus serves to reduce the current flow through the transistor 42 below said preselected value for a portion of each pulse of the sawtooth signal within said predetermined range of input signals. When the level of the input signal exceeds the predetermined range, for example, 10 volts, then the transistor 46 will conduct continuously.

The output signal from the comparator is applied to the control circuit 12 of the switcing means 10. The switching means includes a gate controlled semiconductor switch 52 which is arranged to close and open the load circuit 14 in response to the application of first and second control signals to the control circuit 12 as will be more fully explained.

The first control signal is represented by the application of the positive bias source, e.g. +12 volts, to a load resistor 51 when the transistor 46 is providing full current flow through the emitter-collector junction thereof. The second control signal is represented by substantially zero current flow through the emitter-collector junction of transistor 46 or 0 volts across the resistor 51.

Upon application of the first control signal to the control circut 12, an integrating capacitor 54 of the switching means 10 is charged through a resistor 56. A unijunction transistor 58 discharges the capacitor 54 through a trigger transformer 60 when a preset voltage is reached. The trigger transformer 60 applies such trigger pulses to the gate of the gate control semiconductor switch 52 which in turn connects a source of a.c. voltage across a load 16. Once the semiconductor switch 52 is turned on by a pulse from the trigger transformer 60, the switch provides a very low impedance to the current flow through the load 16 and load circuit 14 until the a.c. voltage from the source 62 changes phase. When the a.c. voltage from the source 62 changes phase, the switch 52 is turned off and remains off until it receives an additional trigger pulse from the transformer 60. By providing high repetition rate for the trigger pulses applied to the gate of the switch 52, relative to the frequency of the a.c. source 62 (i.e. 20 to 1), the switch 52 provides a substantially continuously closed circuit in the output circuit 14 as long as the control transistor 46 is conducting current. The brief intervals between the occurrence of the phase change of the a.c. voltage and the next trigger pulse (5 percent or less of each half wave period of the a.c. voltage) in which the continuity of the output circuit 14 is disrupted would not be detected by most loads. Where the frequency of the a.c. source 62 is 60 $H_z$ (cycles per second), the repetition rate of the trigger pulses applied to transformer 60 may be 1,200 $H_z$ or higher. Where the switch is to be used to switch a d.c. source across a load, a simple transistor switch may be used in place of the gate controlled switch 52 to provide a continuously closed output circuit when the control transistor 46 is turned on.

If desired, a relay 64, illustrated in FIG. 3, may be utilized as the switching means 10 to eliminate the slidht interruption in the continuity of the output circuit 14 when an a.c. source is coupled across the load 16.

Figure 4:
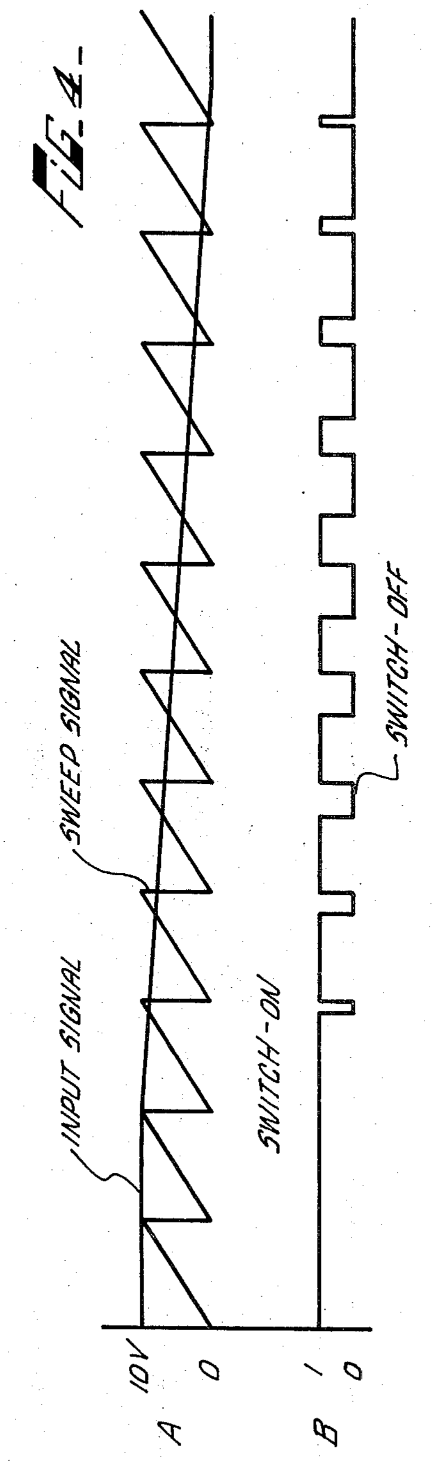
FIG. 4 is a graph illustrating the on-off operation of the switch of FIGS. 1, 2 and 3 in response to a changing level of input signal.

Referring now to FIG. 4, the duty cycle of the switch is illustrated with changes in the level of the input signal applied to input circuit 20. Curve A illustrates an input signal which varies from +10 volts to 0 volts as superimposed on the sawtooth sweep signal from the generator 26. Curve B illustrates the state of the output circuit 14 of the switch which corresponds to the input signal level of curve A. As will be noted by curves A and B, the duty cycle or "on" to "off" time of the switch changes linearly with changes in the level of the input signal.

There has thus been described a switch having a duty cycle which varies with the level of an input signal. Various modifications will be obvious to those skilled in the art.

What is claimed is:

1. A switch having a duty cycle which varies with the level of a d.c. input signal comprising:

switching means having a control circuit, and a load circuit, the switching means being arranged to close and open the load circuit thereof in response to the application of first and second control signals to the control circuit;

sweep generating means for generating a sweep signal which varies between two predetermined levels at a selected repetition rate; and means for comparing the instantaneous levels of the input signal and sweep signal to apply the first control signal to the control circuit of the switching means when the difference between said instantaneous levels exceeds a preselected value and to apply the second control signal to the control circuit of the switching means when the difference between said instantaneous levels does not exceed said preselected value, whereby th ratio of on to off time of the switch is varied in accordance with the level of the input signal between said predetermined levels.

2. The combination as defined in claim 1 wherein the sweep generating means provides a sawtooth sweep voltage and the comparing means applies the first and second control signals to the switching means to provide a switch duty cycle which varies linearly with the level of the input signal over a predetermined range of input signal levels.

3. The combination as defined in claim 1 wherein the switching means includes a gate controlled semiconductor switch, the semiconductor switch being arranged to connect an a.c. source of voltage in series with the load circuit.

4. The combination as defined in claim 1 wherein the switching means includes a relay.

5. The combination as defined in claim 1 wherein the comparing means includes a differential amplifier.

6. The combination as defined in claim 1 wherein the sweep generating means includes means for adjusting the repetition rate of the sweep signal.

switching means having a control circuit, and a load circuit connected in series with the voltage source and load, the switching means being arranged to close and open the load circuit in response to the application of firtst and second control signals to the control circuit;

sweep generating means for generating a sweep signal which varies between two predetermined levels at a selected repetition rate; and means for comparing the instantaneous levels of the input signal and sweep signal to apply the first control signal to the control circuit of the switching means when the difference between said instantaneous levels exceeds a preselected value and to apply the second control signal to the control circuit of the switching means when the difference between said instantaneous levels does not exceed said preselected value, whereby the ratio of on to off time of the switch is varied in accordance with the level of the input signal between said predetermined levels.

7. A switch for periodically connecting a voltage source across a load in accordance with the level of a d.c. input signal comprising:

switching means having a control circuit, and a load circuit connected in series with the voltage source and load, the switching means being arranged to close and open the load circuit in response to the application of first and second control signals to the control circuit;

sweep generating means for generating a sweep signal which varies between two predetermined levels at a selected repetition rate; and means for comparing the instantaneous levels of the input signal and sweep signal to apply the first control signal to the control circuit of the switching means when the difference between said instantaneous levels exceeds a preselected value and to apply the second control signal to the control circuit of the switching means when the difference between said instantaneous levels does not exceed said preselected value, whereby the ratio of on to off time of the switch is varied in accordance with the level of the input signal between said predetermined levels.

* * * * *

UNITED STATES PATENT OFFICE

CERTIFICATE OF CORRECTION

Patent No. 3,766,405 Dated October 16, 1973

Inventor(s) Charles H. Armstrong

It is certified that error appears in the above-identified patent and that said Letters Patent are hereby corrected as shown below:

Column 2, line 41, "4o" should be "40".

Column 3, line 56, "slidht" should be "slight".

Column 4, line 26, "th" should be "the".

Column 4, lines 49 through 67 should be deleted.

Signed and sealed this 19th day of February 1974.

(SEAL)
Attest:

EDWARD M.FLETCHER,JR.
Attesting Officer

C. MARSHALL DANN
Commissioner of Patents